US007809910B2

(12) United States Patent
Sudhakar

(10) Patent No.: US 7,809,910 B2
(45) Date of Patent: Oct. 5, 2010

(54) BACKUP ARCHIVE MANAGEMENT

(75) Inventor: Gosukonda Naga Venkata Satya Sudhakar, Bangalore (IN)

(73) Assignee: Novell, Inc., Provo, UT (US)

( * ) Notice: Subject to any disclaimer, the term of this patent is extended or adjusted under 35 U.S.C. 154(b) by 446 days.

(21) Appl. No.: 11/980,277

(22) Filed: Oct. 30, 2007

(65) Prior Publication Data

US 2009/0013138 A1 Jan. 8, 2009

(30) Foreign Application Priority Data

Jul. 5, 2007 (IN) .................. 1431/DEL/2007

(51) Int. Cl.
*G06F 12/00* (2006.01)
*G06F 13/00* (2006.01)
*G06F 13/28* (2006.01)

(52) U.S. Cl. ..................... 711/162; 711/161
(58) Field of Classification Search ............ None
See application file for complete search history.

(56) References Cited

U.S. PATENT DOCUMENTS

| 5,765,173 | A  | * | 6/1998  | Cane et al. ........................ 1/1 |
| 5,991,774 | A  | * | 11/1999 | Tate et al. ........................ 1/1 |
| 6,076,148 | A  | * | 6/2000  | Kedem ...................... 711/162 |
| 6,101,585 | A  | * | 8/2000  | Brown et al. ................ 711/162 |
| 6,460,054 | B1 | * | 10/2002 | Grummon ......................... 1/1 |
| 6,560,615 | B1 | * | 5/2003  | Zayas et al. ...................... 1/1 |
| 6,662,198 | B2 | * | 12/2003 | Satyanarayanan et al. .......... 1/1 |
| 7,127,577 | B2 |   | 10/2006 | Koning et al. |
| 7,363,444 | B2 | * | 4/2008  | Ji .............................. 711/161 |
| 2003/0046260 | A1 | * | 3/2003  | Satyanarayanan et al. ...... 707/1 |
| 2004/0210608 | A1 | * | 10/2004 | Lee et al. .................... 707/204 |
| 2005/0010835 | A1 | * | 1/2005  | Childs et al. .................. 714/6 |
| 2005/0283623 | A1 | * | 12/2005 | Vanderheyden et al. ..... 713/193 |
| 2006/0004890 | A1 | * | 1/2006  | Semple et al. ............. 707/204 |
| 2006/0206547 | A1 | * | 9/2006  | Kulkarni et al. ............ 707/205 |
| 2007/0214197 | A1 | * | 9/2007  | Bolik et al. ................. 707/204 |
| 2007/0226438 | A1 | * | 9/2007  | Erofeev ..................... 711/162 |
| 2008/0133619 | A1 | * | 6/2008  | Nichols et al. ............. 707/204 |

* cited by examiner

*Primary Examiner*—Pierre-Michel Bataille
*Assistant Examiner*—Matthew R Chrzanowski
(74) *Attorney, Agent, or Firm*—Schwegman, Lundberg & Woessner, P.A.

(57) ABSTRACT

Apparatus, systems, and methods may operate to taking a snapshot of an origin volume in conjunction with a backup process in response to receiving a snapshot request by a snapshot service. A persistent time stamp associated with the creation time of the snapshot may be recorded on the origin volume. The persistent time stamp is accessible to the file system process associated with the origin volume in most embodiments. If access to a file is requested, the time the file was last modified may be compared with the persistent time stamp, and if the file modified time is earlier than the persistent time stamp, the file's archive bit can be reset. Otherwise, the archive bit is not reset. Additional apparatus, systems, and methods are disclosed.

23 Claims, 4 Drawing Sheets

BACKUP ARCHIVE MANAGEMENT

RELATED APPLICATIONS

The present application claims priority to India Patent Application No. 1431/DEL/2007 filed in the India Patent Office on Jul. 5, 2007 and entitled "BACKUP ARCHIVE MANAGEMENT;" the disclosure of which is incorporated by reference herein.

FIELD

The embodiments disclosed herein relate generally to data processing, including the management of file volume backup processes.

BACKGROUND

Data is collected, organized, and processed for virtually every transaction and communication that occurs in today's global economy. The integrity of this information (e.g., the authenticity and/or security of a message) has become important to enterprises and individuals. Consequently, a variety of techniques for securing and replicating information exist in the industry, including information backup processes to protect against disk failure and other kinds of catastrophic data loss.

Operating systems commonly store an archive bit in conjunction with each file. When the file is created or modified, the archive bit is set to indicate the file has not been backed up since the last change was made. After the file is backed up (e.g., using a snapshot operation), the archive bit can be reset. However, scripts that operate to reset archive bits for corresponding origin files may not function correctly in some instances, since a file that has been backed-up might be modified between the time a snapshot is taken of the file, and the time its archive bit is reset.

SUMMARY

In various embodiments, apparatus, systems, and methods for backup archive management are provided. For example, in some embodiments, backup archive management includes, in response to receiving a snapshot request by a snapshot service, taking a snapshot of an origin volume in conjunction with a backup process, and recording a persistent time stamp associated with the creation time of the snapshot. The persistent time stamp is accessible to the file system process associated with the origin volume in most embodiments. If access to a file is requested, the time the file was last modified may be compared with the persistent time stamp, and if the file modified time is earlier than the persistent time stamp, the file's archive bit can be reset. Otherwise, the archive bit is not reset. Additional embodiments are described, and along with the foregoing example, will be set forth in detail below.

DETAILED DESCRIPTION

Figure 1:
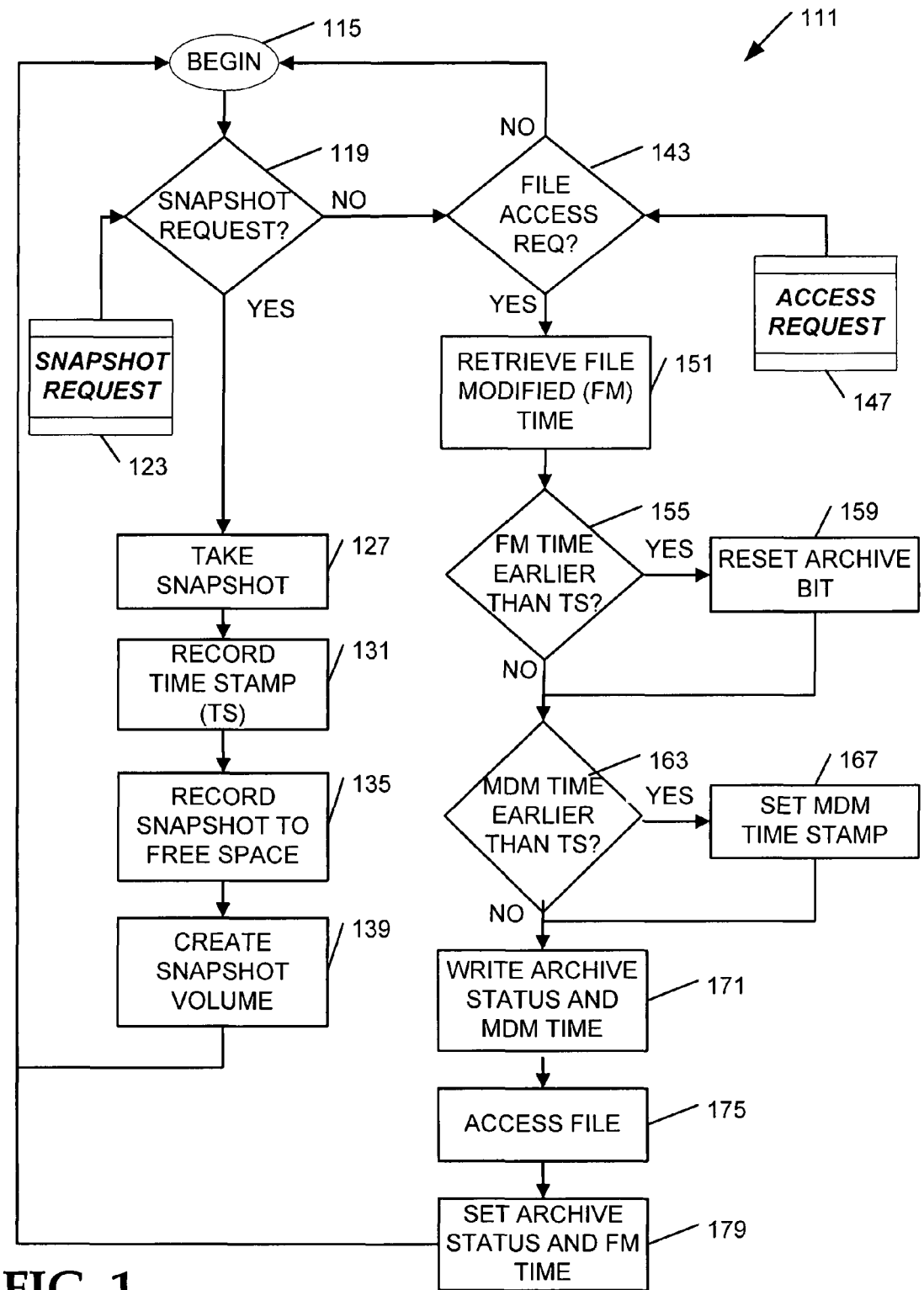
FIG. 1 is a flow diagram illustrating backup archive management methods according various embodiments of the invention.

Some of the challenges described above may be addressed by recording a time stamp associated with the most recent backup snapshot operation such that the file system on the origin volume is aware of and has access to the time stamp. This time stamp can be recorded between the administrative freeze and thaw commands, after a backup snapshot has been made. Once the snapshot is taken, any application that queries the metadata of a file results in a file system comparison of the last file modification time with the time stamp saved on the volume. If the file modified time is later than time stamp, no action will be taken. Otherwise (if the file modified time is earlier than the time stamp), the file system will operate to clear the archive bit before returning to the application. The archive bit may be cleared as part of the meta-data associated with the file.

As used herein, an "application" refers to a set of software instructions, a service, or a system that interacts with data housed at a "data source," which refers to a volume or collection of volumes that house the data for applications.

The terms "local," "remote," "source," and "destination" are relative, which means that when something is designated as being "local" or a "source," then this refers to an entity or resource operating within the environment in which the applications operate against the master data source and volume. Conversely, when something is designated as being "remote" or a "destination," then this refers to an entity or resource operating within an environment where a replicated volume is being maintained.

A "persistent time stamp" is a time stamp associated with an origin file volume that persists in memory (e.g., disk memory) from one snapshot request to the next snapshot request. The persistent time stamp is accessible to multiple servers, each with its own file system process.

A "snapshot" refers to a temporal dependent view of a collection of data. In other words, a data source and applications operating on data being housed in the data source may have a given state of the data as it exists at a particular instant in time captured as a snapshot.

A "thaw" command or operation refers to an instruction issued to the applications indicating that the applications may begin normal processing. As will be described more completely below, applications may from time to time be suspended or frozen (e.g., using a "freeze" command) from any further processing until other processing completes or is acknowledged' thus, a "thaw" command permits the applications to resume from a suspended state of operation.

Various embodiments of the invention can be implemented in existing network architectures, directory services, security systems, storage interfaces, operating systems, file system process, backup systems, replication systems, and/or communication devices. For example, in some embodiments, the techniques presented herein are implemented in whole or in part using Novell® network services, proxy server products, email products, operating system products, and/or directory services products distributed by Novell, Inc. of Provo, Utah.

Embodiments of the invention can therefore be implemented in a variety of architectural platforms, operating and server systems, devices, systems, or applications. Any particular architectural layout or implementation presented herein is thus provided for purposes of illustration and comprehension only, and is not intended to limit the various embodiments.

FIG. 1 is a flow diagram illustrating backup archive management methods 111 according various embodiments of the invention. The methods 111 are implemented in a machine-accessible and readable medium. The backup archive management methods 111 are operational over processes within and among networks. The networks may be wired, wireless, or a combination of wired and wireless. The methods 111 may be implemented as instructions, which when accessed by a machine, perform the processing depicted in FIG. 1. Given this context, backup archive management is now discussed with reference to FIG. 1.

In some embodiments, the method 111 may begin at block 115, and continue on to block 119 with determining whether a snapshot request has been received. For example, if a snapshot request has been sent at block 123 from an application (e.g., an administrative process, a backup application, or a virtualization service), and received as determined at block 119, then in response to receiving the snapshot request at a snapshot service, the method may continue on to block 127. Here, the snapshot of the origin volume is taken in conjunction with a backup process, and a persistent time stamp associated with the creation time of the snapshot is recorded at block 131. The persistent time stamp should be accessible to the file system process associated with the origin volume.

Before the snapshot is taken, the system administrator process can send a "freeze" command to the applications and/or file system that might engage in writing to the origin volume. This command prevents the applications and file system from writing to the origin volume after it is given. Once the snapshot is taken, a "thaw" command can be given, so that normal file input/output operations may resume. Between the freeze and thaw commands, the system administrator can now give a third command, which is useful during both full and incremental backup scenarios.

Just about any application is permitted to send a snapshot request to the snapshot service at block 123. Such applications may also send a command to record the persistent time stamp on the origin volume at block 131.

This command, which may be called a "writetimestamp" command, can be used to write a persistent time stamp (e.g., in universal time code) to a reserved file in the file system, or to a /proc file system, or to a virtual file system, or input/output control (IOCTL) system calls, or to record the persistent time stamp in any way that permits the file system to be notified of the existence of the persistent time stamp, and to access it. Thereafter, if another snapshot request is made, the file system will be aware of the first and second persistent time stamps, and correct information with respect to the status of the archive bit (i.e., whether the file has actually been modified since the snapshot was obtained) can be determined.

Thus, in many embodiments, the method 111 includes recording the snapshot to free space at block 135. The method 111 may also include creating a snapshot volume to store the snapshot at block 139. At this point, the method 111 may return to block 115.

If no snapshot request is received, as determined at block 119, the method 111 may continue on to block 143 to determine if a file access request has been received a process at block 147. For example, the comparison that takes place at block 143 may be prompted by a file read request or a second snapshot request transmitted by a process at block 147 to the snapshot service.

If a file access request has been received, as determined at block 143, then the method 111 may include retrieving the file modified time using a file system process at block 151.

The method 111 may then go on to include comparing the file modified time with the persistent time stamp, wherein the file modified time is associated with the file to be accessed on the origin volume. If the file modified time is earlier than the persistent time stamp, as determined at block 155, then the method 111 may include resetting an archive bit associated with the file at block 159. If the file modified time is not earlier than the persistent time stamp, as determined at block 155, then the method 111 may include refraining from resetting the archive bit.

The file system process may be used to set and reset the archive bit. In some embodiments, resetting the archive bit may comprise clearing the archive bit.

Regardless of the timing relationship between the file modified time and the persistent time stamp, the method 111 may include determining whether the meta-data modified time is earlier than the persistent time stamp at block 163. If this is the case, then the method 111 may include writing the meta-data modified time to be the same as the persistent time stamp at block 167. In other words, the meta-data modified time can be dealt with in the same way as the archive bit, so that if the meta-data modified time is later than the persistent timestamp, then no change is made, and the method 111 continues on to block 171. Otherwise, the meta-data modified time is set to the same time as the persistent time stamp, and returned to the application requesting access to the file at block 167.

At block 171, the method 111 may include writing the meta-data modified time and the status of the archive bit, each as part of meta-data associated with the file. The method 111 may then go on to block 175 with accessing the file. After the file is accessed, the method 111 may include setting the archive bit status and file modified time at block 179 (if the file is modified during the access activity), and then return to the beginning at block 115.

For example, the method 111 may include executing a file read process to read a file on the origin volume and, if the meta-data modified time associated with the file is later than the persistent time stamp, returning the meta-data associated with the file. Otherwise, if the meta-data modified time associated with the file is earlier than the persistent time stamp, the method may include setting the meta-data modified time to be the same as the persistent time stamp, and returning the meta-data associated with the file.

Thus, in some embodiments, the method 111 may include executing the process of comparing the file modified time with the persistent time stamp prior to reading the file. This depends on the system design, because when the archive bit is changed, the meta-data modified time may also be changed. In some file systems, the file meta-data is stored separately from the file data, and so the meta-data may be read prior to reading the file data. In other file systems, both the file meta-data, and the file itself, are read at substantially the same time.

Figure 2:
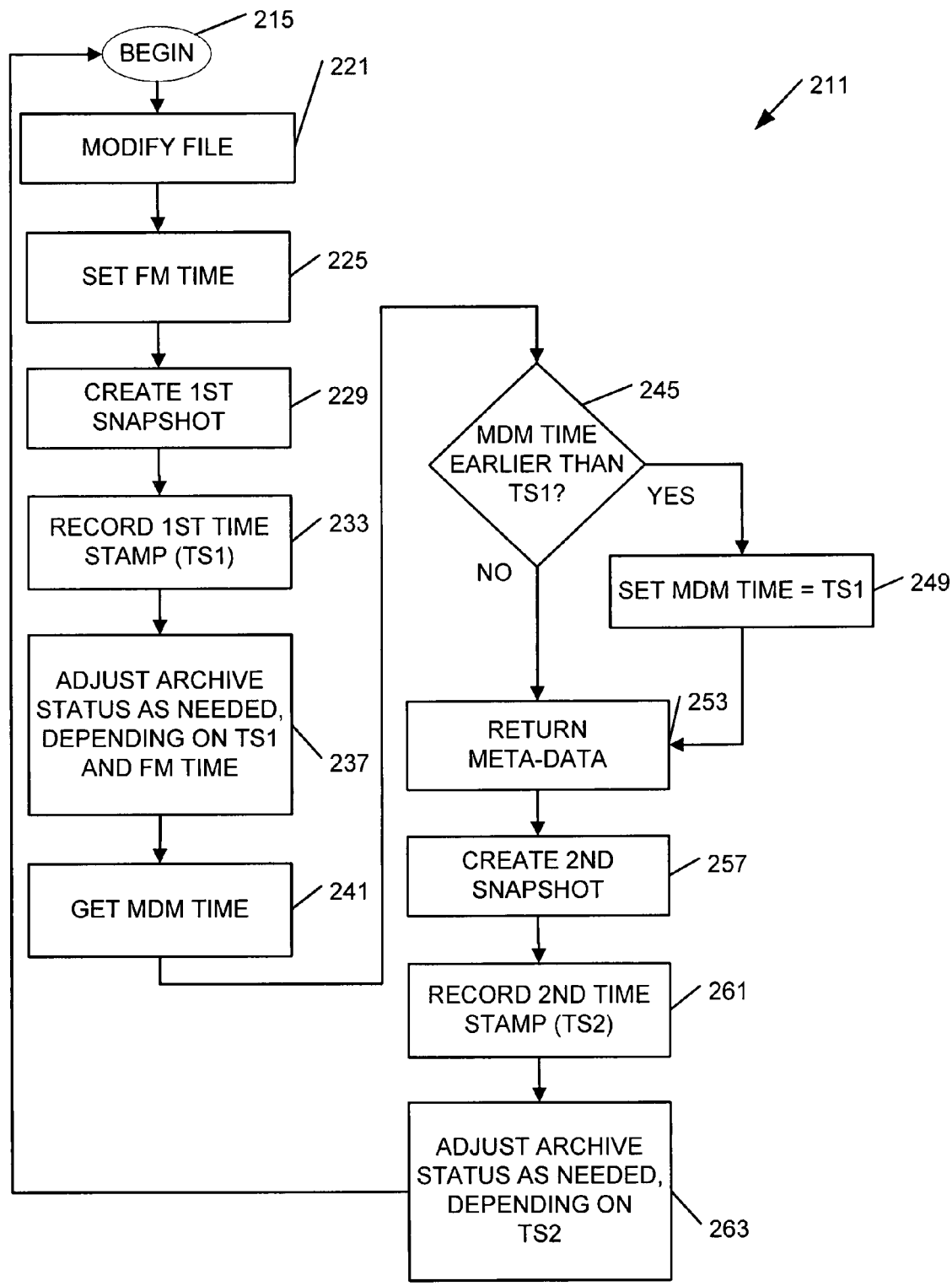
FIG. 2 is another flow diagram illustrating backup archive management methods according various embodiments of the invention.

FIG. 2 is another flow diagram illustrating backup archive management methods 211 according various embodiments of the invention. In this case, backup archive management is described with additional emphasis on multiple snapshot operations. The methods 211 are implemented in a machine-accessible and readable medium. The backup archive management methods 211 are operational over processes within and among networks. The networks may be wired, wireless, or a combination of wired and wireless. The methods 211 may be implemented as instructions, which when accessed by a machine, perform the processing depicted in FIG. 2.

To implement backup archive management, a method 211 may begin at block 215, and continue on to block 221 with modifying a file. At this point, the file modification time may be set and recorded at block 225. For example, the file modification time may recorded by storing it on the origin volume.

In some embodiments, the method 211 may include, at block 229, creating a first snapshot of data stored on the origin volume (including the modified file) as part of a backup process. The method 211 may go on to block 233 to include recording a first persistent time stamp associated with creating the first snapshot. Recording in this case may include storing the first persistent time stamp on the origin volume.

The method 211 may include, at block 237, adjusting the state of the archive bit associated with the modified file (forming a portion of the origin volume) based on the timing relationship between the first persistent time stamp and the modification time of the file. Adjusting the state of the archive bit (e.g., setting and resetting the archive bit) may occur as explained previously. For example, adjusting the state of the archive bit may include selecting from one of setting and resetting the archive bit, or clearing the archive bit.

In some embodiments, the method 211 may include obtaining the time at which meta-data was modified at block 241, wherein the meta-data is associated with the (modified) file. The meta-data modified time may be obtained by reading meta-data associated with the file in most embodiments.

At this point, the method 211 may include determining whether the meta-data modified time is earlier than the first persistent time stamp at block 245. If so, then the method 211 may include setting the meta-data modified time to be the same as the first persistent time stamp at block 249. For example, this may include setting the meta-data modified time associated with the file to be the same as the first persistent time stamp, and storing the result as part of the meta-data associated with the file. Then, whether or not the meta-data modified time is earlier than the first persistent time stamp, the method 211 can include returning the meta-data associated with the file at block 253.

The method 211 may go on to block 257 with creating a second snapshot of the data, and recording a second persistent time stamp associated with creating of the second snapshot at block 261. The method 211 may continue on to include adjusting the state of the archive bit associated with the file (forming a portion of the origin volume) based on the timing relationship between the second persistent time stamp and the first persistent time stamp, as noted previously, at block 263. That is, when the second snapshot is taken, the administrator may choose to use it as the backup, and a new command can be issued to record the second persistent time stamp at the origin volume. The origin volume, in turn, may now use the second persistent time stamp instead of the first persistent time stamp recorded when first snapshot was taken.

The file system data structure on the disk may have a field which contains the time stamp. When a new snapshot is taken, the block containing the time stamp becomes part of the snapshot and is available to the file system that has access to the snapshot. Initially, when no snapshots are taken, this field may be filled with zeroes. When the first snapshot is taken, there is no time stamp available to form part of the first snapshot, so this field within the snapshot may simply be empty (e.g., containing all zeroes). However, the origin will have the time stamp recorded therein (e.g., see time stamp TSN in FIG. 3). When a second snapshot is taken, the time stamp for the second snapshot is recorded as time stamp TS2 on the origin, and the time stamp TS1 can be used to form a part of the second snapshot, since time stamp TS1 is available on the file system data structure on disk.

Thus, when files are read from the origin after the second snapshot has been taken, the comparison is made against TS2. When files are read from the first snapshot volume after the first snapshot has been taken, no comparison is made. And when files are read on from the second snapshot volume after the second snapshot has been taken, the comparison is made against time stamp TS1.

As noted previously, initially, the origin will not have any time stamp to compare against. After the first snapshot is taken the origin will be informed of the existence of the first persistent time stamp. After a second snapshot is taken, the file system on the origin will be notified of the existence of the second persistent time stamp, and may or may not have access to the first persistent time stamp, depending on the particular implementation. The new time stamp can be used to communicate the correct archive bit status, as well as to adjust the archive bit state on the origin, since only one time stamp is used at any time.

For example, when applications read files from the origin after the second snapshot has been taken, the applications will find that the archive bit has been set if the file modified time is later than the second persistent time stamp. They will find that the archive bit has been reset if the file modified time is earlier than the second persistent time stamp. The meta-data modification time is handled in a similar manner, by comparing the meta-data modification time with the first persistent time stamp.

When applications read files from second snapshot (i.e., from the snapshot volume, and not the origin) after the second snapshot has been taken, the applications will find that the archive bit has been set if the file modified time is later than the first persistent time stamp. They will find that the archive bit has been reset if the file modified time is earlier than the first persistent time stamp. The meta-data modification time is handled in a similar manner, by comparing the meta-data modification time with the first persistent time stamp.

If third snapshot (e.g., for backup purposes) is taken, then the system administrator can use the new command (e.g., "writetimestamp) to record a third persistent time stamp at the origin. The origin will now use this third time stamp, instead of the second time stamp that was used after the second snapshot was taken. The file system may or may not have access to the old (second) time stamp after the third snapshot, and will use the third time stamp to adjust and communicate the status of the archive bit properly.

For example, when applications read files from the third snapshot (i.e., from the snapshot volume) instead of reading from the origin, they will find the archive bit being set if the modified time of the file is later than the second persistent time stamp. They will find the archive bit reset if the file modified time is earlier than the second time stamp. Similarly, the meta-data modified time can also be compared with the time of the second persistent time stamp for files that are read after the third snapshot is taken. Many other embodiments may be realized.

Figure 3:
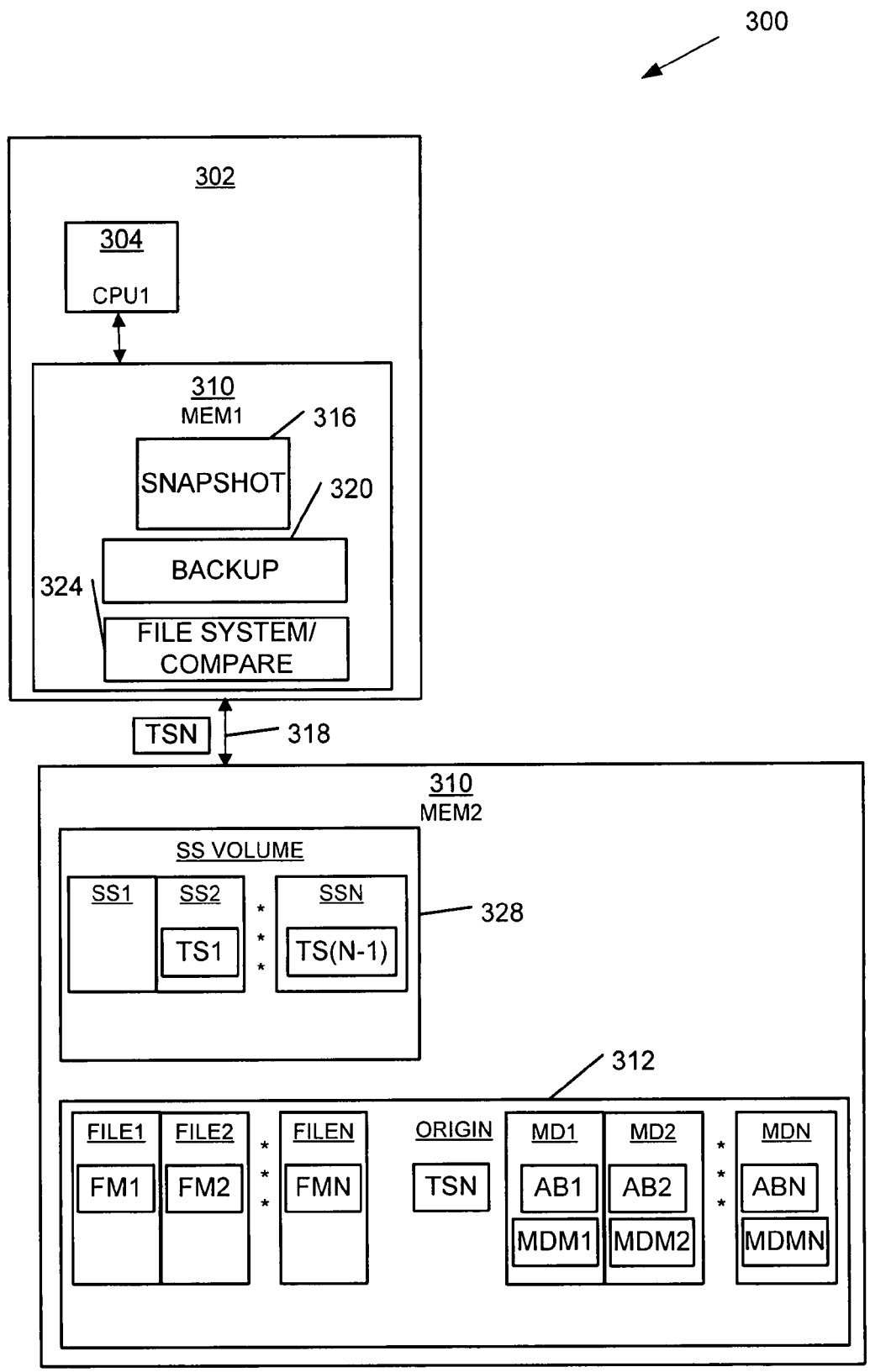
FIG. 3 is a block diagram of an backup archive management apparatus according various embodiments of the invention.

For example, FIG. 3 is a block diagram of an backup archive management apparatus 300 according various embodiments of the invention. The backup archive management apparatus 300 is implemented in a machine-accessible and readable medium and is operational over one or more networks (e.g., the LAN 318 and the WAN 338). The networks may be wired, wireless, or a combination of wired and wireless. The backup archive management apparatus 300 implements, among other things, the processing associated with the backup archive management methods 111 and 211 of FIGS. 1 and 2, respectively.

Turning now to FIG. 3, it can be seen that in some embodiments the backup archive management apparatus 300 comprises a memory 310 (MEM2) to store an origin volume 312, and a processor 304 to execute a snapshot process 316 to take a snapshot of the origin volume 312 in conjunction with a backup process 320. The same memory MEM2, or another memory, can include a snapshot volume 328 to store the snapshot.

The snapshot process 316 can be used to record a persistent time stamp (e.g., time stamps TS1, TS2, . . . , TS(N-1), TSN) associated with the creation time of the corresponding snapshot (e.g., snapshots SS1, SS2, . . . , SSN). The persistent time stamp TS1, TS2, . . . , TS(N-1), TSN is accessible to a file system process (e.g., file system processes FILE1, FILE2, . . . , FILEN) associated with the origin volume 312. Thus, a user process (not shown) can operate through the file system processes FILE1, FILE2, . . . , FILEN, if desired. The processor 304 may be used to execute a process 320 to issue a command to transmit the persistent time stamp (e.g., TSN) to the origin volume 312.

In most embodiments, the processor 304 can be used to execute a process 324 to compare the most recent persistent time stamp (e.g., TSN) with a file modified time (e.g., FMN) of a file (e.g., FILEN) on the origin volume 312 as part of a file read operation. If the file modified time (e.g., FMN) is earlier than the persistent time stamp (e.g., TSN), then the process 324 can be used to reset the archive bit (e.g., ABN) associated with the file (e.g., FILEN).

The apparatus 300 may comprise an execution element 302, such as a switch (e.g., an L4 switch), a server, a terminal, a personal computer, a workstation, or any combination of these. The memory MEM1 and the processor 304 may be included in a single server 302, as shown, or exist as separate hardware elements, perhaps coupled together by a local area network (LAN) 318. Similarly, the memories 310 may be included in a single server 302, or operate as separate units, illustrated in FIG. 3. Modules may comprise hardware, software, and firmware, or any combination of these.

The execution element 302 may comprise a single entity, or several entities in communication with one another, such as one or more Novell® BorderManager® (NBM) proxy servers, Novell® Access Manager™ Linux® Access Gateways, or any intermediary that accomplishes backup process execution.

Figure 4:
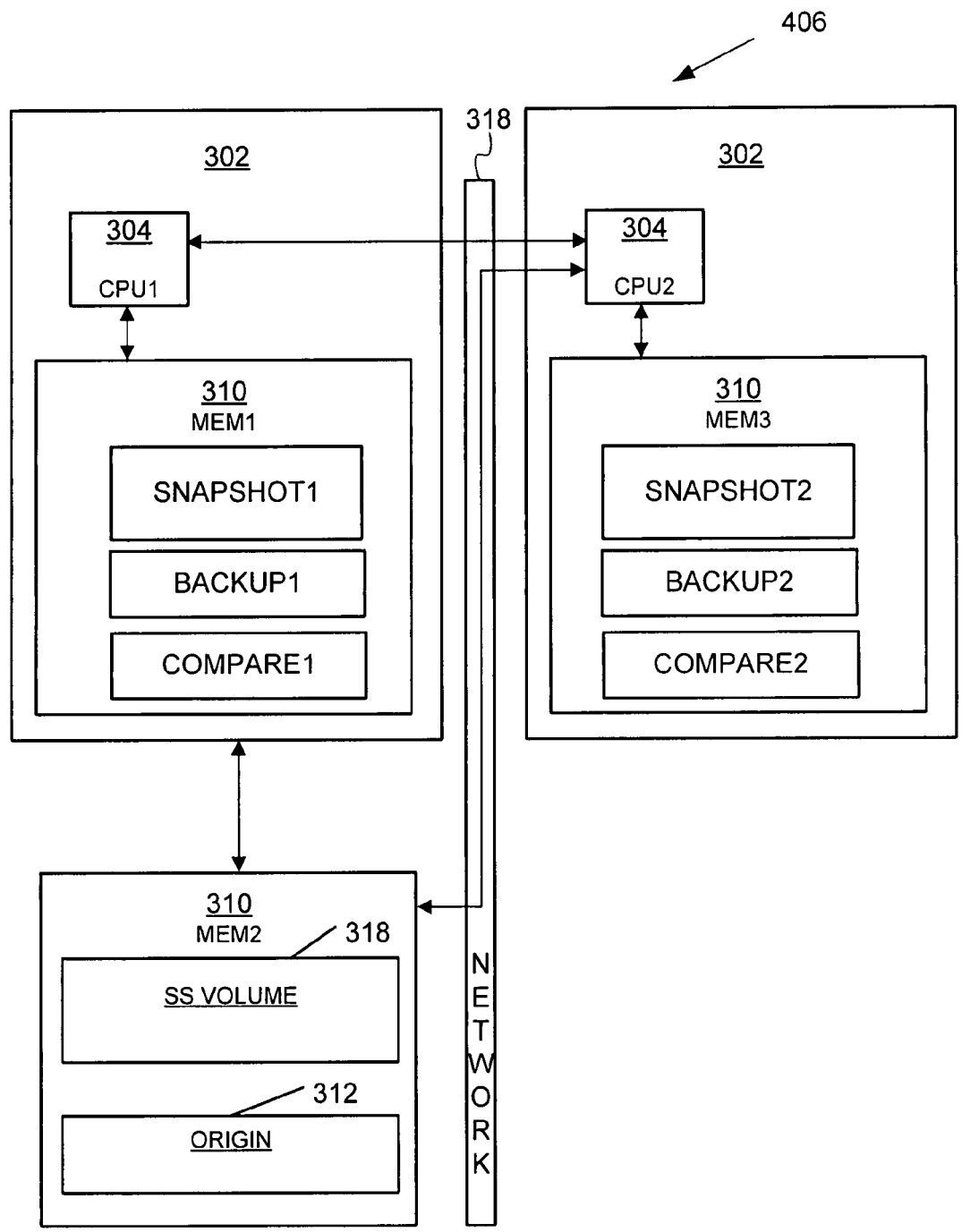
FIG. 4 is a block diagram of an backup archive management system according various embodiments of the invention.

FIG. 4 is a block diagram of an backup archive management system 410 according various embodiments of the invention. The backup archive management system 406 is implemented in a machine-accessible and readable medium and is operational over one or more networks (e.g., LANs 418 and WAN 438). The networks may be wired, wireless, or a combination of wired and wireless. The backup archive management system 406 includes multiple instances of the apparatus 300, and implements, among other things, the processing associated with the backup archive management methods 111 and 211 of FIGS. 1 and 2, respectively.

Turning now to FIG. 4, it can be seen that an backup archive management system 406 may comprise a memory MEM2 to store an origin volume 312, and a plurality of processors 304 to execute a snapshot process (e.g., SNAPSHOT1 and/or SNAPSHOT2) to take a snapshot of the origin volume 312 in conjunction with a backup process (e.g., BACKUP1 and/or BACKUP2, respectively) and to record a persistent time stamp associated with the creation time of the snapshot, as described with respect to the apparatus 300 of FIG. 3. The snapshots can be stored in the memories MEM1, MEM3, or in the snapshot volume 328 of memory MEM2. Again, the persistent time stamp is accessible to individual file system processes (e.g., COMPARE1 and COMPARE2) corresponding to the plurality of processors (CPU1 and CPU2, respectively).

In some embodiments, a plurality of servers 302 can be used to house the plurality of processors 304. In some embodiments, the memories 310 and the plurality of processors 304 may form a portion of a symmetric multiprocessing architecture, perhaps housed together in a single server 302 (not shown).

Implementing the apparatus, systems, and methods described herein may thus provide improved archival backup management, since each file access is preceded by comparing the actual backup status against the actual status of file modification, via time stamps that are persistently recorded in conjunction with each snapshot taken. Archive bits are set/reset based on the timing relationship between the file modification time and the snapshot time. Meta-data modification time stamps can be treated in a similar fashion, providing additional information to system backup processes.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. An apparatus, comprising:
   a memory to store an origin volume; and
   a processor to execute a snapshot process to take a snapshot of the origin volume in conjunction with a backup process and to record a persistent time stamp associated with the creation time of the snapshot, wherein the persistent time stamp is accessible to a file system process associated with the origin volume, and
   wherein the processor is to execute a process to compare the persistent time stamp with a file modified time of a file on the origin volume as part of a file read operation, and when the file modified time is earlier than the persistent time stamp, to reset an archive bit associated with the file, otherwise refraining from resetting the archive bit.

2. The apparatus of claim 1, wherein the processor is to execute a process to issue a command to transmit the persistent time stamp to the origin volume.

3. A system, comprising: a memory to store an origin volume; and
   a plurality of processors to execute a snapshot process to take a snapshot of the origin volume in conjunction with a backup process and to record a persistent time stamp associated with the creation time of the snapshot, wherein the persistent time stamp is accessible to individual file system processes corresponding to the plurality of processors, and wherein the plurality of processors is to execute a process to compare the persistent time stamp with a file modified time of a file on the origin volume as part of a file read operation, and when the file modified time is earlier than the persistent time stamp, to reset an archive bit associated with the file, otherwise refraining from resetting the archive bit.

4. The system of claim 3, comprising:
a plurality of servers to house the plurality of processors.

5. The system of claim 3, wherein the memory and the plurality of processors form a portion of a symmetric multiprocessing architecture.

6. A method, comprising:
in response to receiving a snapshot request by a snapshot service, taking a snapshot of an origin volume in conjunction with a backup process;
recording a persistent time stamp associated with the creation time of the snapshot, wherein the persistent time stamp is accessible to a file system process associated with the origin volume;
comparing a file modified time with the persistent time stamp, wherein the file modified time is associated with a file on the origin volume;
when the file modified time is earlier than the persistent time stamp, resetting an archive bit associated with the file; and
otherwise, refraining from resetting the archive bit.

7. The method of claim 6, comprising:
sending the snapshot request from one of an administrative process, a backup application, and a virtualization service.

8. The method of claim 6, wherein the comparing is prompted by a file read request or a second snapshot request.

9. The method of claim 6; comprising:
retrieving the file modified time using the file system process.

10. The method of claim 6, wherein the resetting comprises:
resetting the archive bit using the file system process.

11. The method of claim 6, comprising:
recording the snapshot to free space; and
creating a snapshot volume to store the snapshot.

12. The method of claim 6, comprising:
executing comparing the file modified time with the persistent time stamp prior to reading the file.

13. The method of claim 6, comprising:
writing a status of the archive bit and a meta-data modified time as part of meta-data associated with the file.

14. The method of claim 13, comprising:
writing the meta-data modified time to be the same as the persistent time stamp if the meta-data modified time is earlier than the persistent time stamp.

15. The method of claim 6, comprising:
sending a command to record the persistent time stamp on the origin volume.

16. The method of claim 15, wherein the command is sent by one of an administrative process, a backup application, and a virtualization service.

17. The method of claim 6, comprising:
executing a file read process to read a file on the origin volume;
if a meta-data modified time associated with the file is later than the persistent time stamp, returning meta-data associated with the file; and
otherwise, setting the meta-data modified time to be the same as the persistent time stamp, and returning the meta-data associated with the file.

18. A method, comprising:
creating a first snapshot of data stored on an origin volume as part of a backup process;
recording a first persistent time stamp associated with the creating of the first snapshot; and
adjusting the state of an archive bit associated with a file forming a portion of the origin volume based on a timing relationship between the first persistent time stamp and a modification time of the file,
wherein the adjusting the state of the archive bit further comprises:
comparing a file modified time with the persistent time stamp, wherein the file modified time is associated with a file on the origin volume;
when the file modified time is earlier than the persistent time stamp, resetting an archive bit associated with the file; and
otherwise, refraining from resetting the archive bit.

19. The method of claim 18, comprising:
modifying a meta-data modified time associated with the file to be the same as the first persistent time stamp as part of meta-data associated with the file.

20. The method of claim 18, comprising:
determining a meta-data modified time associated with the file by reading meta-data associated with the file;
if the meta-data modified time is later than the first persistent time stamp, returning the meta-data associated with the file; and
otherwise, setting the meta-data modified time to be the same as the first persistent time stamp, and returning meta-data associated with the file.

21. The method of claim 18, wherein the recording comprises:
storing the first persistent time stamp on the origin volume.

22. The method of claim 18, comprising:
creating a second snapshot of the data;
recording a second persistent time stamp associated with the creating of the second snapshot; and
adjusting a state of an archive bit associated with a second file forming a portion of the origin volume based on a timing relationship between the second persistent time stamp and a file modification time.

23. The method of claim 18, comprising:
creating a second snapshot of the data, wherein the second snapshot includes the first persistent time stamp; and
adjusting the state of the archive bit associated with a file forming a portion of a snapshot volume based on a timing relationship between the first persistent time stamp and a file modification time.

* * * * *